March 8, 1932.  S. HART ET AL  1,848,716
ELECTRIC HEATER
Filed Oct. 3, 1928
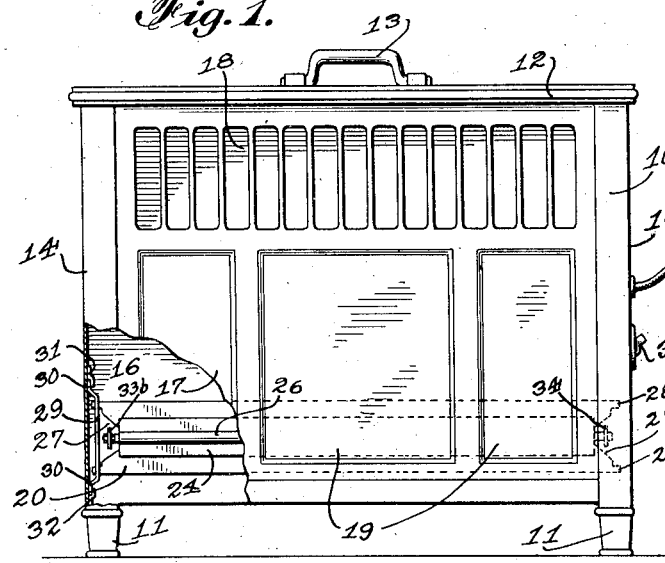
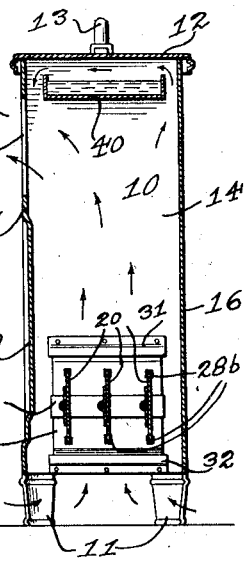
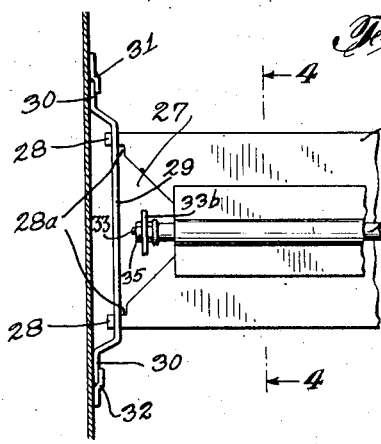
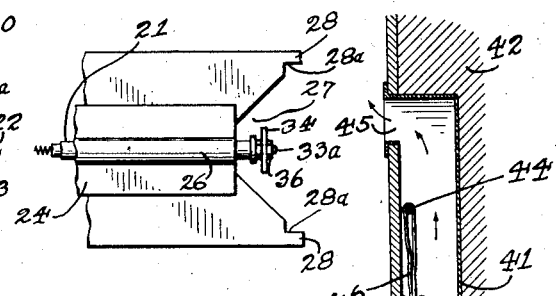
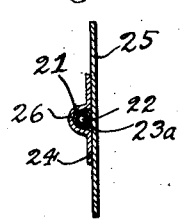
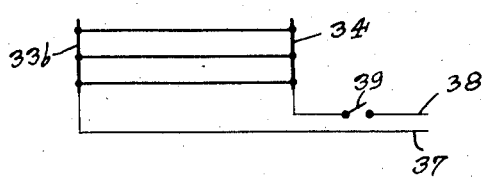
INVENTORS:
Stanley Hart,
Maurice G. Steele
BY: H. G. Manning
ATTORNEY Patented Mar. 8, 1932

1,848,716

UNITED STATES PATENT OFFICE

STANLEY HART, OF NEW BRITAIN, AND MAURICE G. STEELE, OF FARMINGTON, CONNECTICUT, ASSIGNORS TO THE HART & HUTCHINSON COMPANY, OF NEW BRITAIN, CONNECTICUT, A CORPORATION OF CONNECTICUT

ELECTRIC HEATER

Application filed October 3, 1928. Serial No. 310,054.

This invention relates to electric heaters, and more particularly to a convection heater for use in warming the air in a room.

One object of this invention is to provide an air heater of the above nature comprising a box-shaped cabinet in which is supported a plurality of spaced vertical electrically heated plates.

A further object is to provide an electric heating cabinet of the above nature in which the vertical heating plates may first be assembled as a unit which may then be detachably supported in the cabinet.

A further object is to provide an electric heating cabinet of the above nature having means for humidifying the heated air rising by convection from the unit of heating plates.

A further object is to provide a device of this nature which will be simple in construction, inexpensive to manufacture, easy to install and manipulate, compact, ornamental in appearance, and very efficient and durable in use.

With these and other objects in view there have been illustrated on the accompanying drawings several forms in which the invention may be conveniently embodied in practice.

Fig. 1 represents a front elevation, partly broken away, of the electric heating cabinet.

Fig. 2 is a side sectional view of the same.

Fig. 3 is a fragmentary front view of one of the vertical plates of the heating unit, showing the fish-tail fins at its ends adapted to embrace the bus bars of the electric heating elements mounted on the plates.

Fig. 4 is a sectional view of one of the electric heating elements per se.

Fig. 5 is a wiring diagram of the three electric heating elements connected in parallel by a pair of bus bars.

Fig. 6 is a sectional view of a modified form of the invention showing the heating unit concealed within a wall stack and provided with a modified form of humidifying apparatus.

Referring now to the drawings in which like reference numerals denote corresponding parts throughout the several views, the numeral 10 indicates a box-shaped cabinet member, open at the bottom for the entrance of air to be heated, and having four legs 11 for supporting it upon the floor of a room. The cabinet 10 is provided with a removable top cover 12 having a handle 13 for convenience in manipulation, said cabinet comprising a pair of side walls 14 and 15, a rear wall 16, and a front wall 17. The air after being heated is adapted to escape from the cabinet through an upper grille section 18 below which are ornamental panels 19.

Heat is supplied to the air in the radiator cabinet by means of a plurality of vertical plates 20, each of which has an electrical heating element 21 secured in contact therewith as by a fastening plate 24. The electric heating elements 21 may be of any desired type, but are preferably of the type disclosed in the United States Patent Number 1,494,939, dated May 29, 1924. In this heating element a helical resistance conductor 22 is imbedded in a compacted mass of insulated material 23 enclosed within an outer metallic shell 23a. The outer shell 23a is enclosed between the plates 20 and 24, the plate 24 having a longitudinal groove 26 for receiving the conducting shell 23a. These plates 20 and 24 are welded together in such a manner as to clamp the metallic shell 23a tightly therebetween.

The plates 20, as most clearly shown in Fig. 3, are provided at each end with a V-shaped recess 27 leaving two side nibs 28 somewhat resembling a fish tail, the insides of said nibs having shoulders 28a to be inserted in recesses 28b in a pair of brackets 29, one of which is located at each end of the heating unit. Each of the brackets 29 has a pair of feet 30 adapted to lie in flat contact with the vertical side walls 14 and 15 of the cabinet 10, being detachably held in such position in any suitable manner, as by a pair of oppositely disposed clip flanges 31 and 32, the flanges 31 serving to retain the top feet 30, while the flanges 32 hold the lower feet 31. By means of this construction it will be evident that the assembled unit consisting of the three spaced vertical plates 20 and attached electric heating elements 21 may be readily removed from the heating cabinet whenever desired for cleaning or repairs.

In order to supply current to the electric heating elements 21, each of said elements is provided at its opposite ends with binding posts 33 and 33a upon which a pair of bus bars 33b and 34 are clamped by nuts 35 and 36. One of the three binding posts 33 is then connected to a line wire 37, and one of the three binding posts 33a to the other line wire 38, the circuit being controlled by a switch 39 of the single-pole single-throw type.

In operation, after the current has been turned on, by means of the switch 39, the heating elements 21 and vertical plates 20 in contact therewith will rapidly become hot and will communicate their heat by convection to the air surrounding them. A continuous upward flow of hot air will thus be caused to rise in the cabinet and will pass out into the room through the grille 18 at the top of the front wall 17.

If desired, a shallow pan 40 of water, as shown in Fig. 2, may be located near the top of the cabinet 10 for humidifying the heated air before it passes out into the room, the direction of air flow being shown by the arrows in Fig. 2.

In the modified form of the invention illustrated in Fig. 6, the assembled heating plates 20 are located within a stack 41 concealed within a wall 42. In operation, the air is drawn in through a lower opening 43 and flows upwardly in the direction of the arrows, around the heating plates 20, alongside a vertical humidifier 44, and leaves the cabinet through an upper outlet 45. The humidifier 44 comprises a vertically suspended sheet 46 of absorbent fabric, the lower end of which is adapted to dip within a supply of water in a horizontal tank 47 secured to the front of the stack 41.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electric air heater, a cabinet having a lower air inlet and an upper air outlet, a heating unit comprising a pair of opposed vertical frames detachably supported by the sides of said cabinet, and a plurality of vertical electrically heated plates supported at their ends by said frames, said unit being assembled separately from the remainder of the heater.

2. In an electric heater, a plurality of vertical flat plates, each of which has an electric heating element in heat contact therewith, means for supporting the ends of said plates, said plates having bifurcated ends, and a pair of bus bars passing through openings in the ends of said plates for electrically connecting the terminals of said electric heating elements to a source of current.

3. In an electric heater, a purality of vertical flat plates having fish-tail ends, each of which has an electric heating element in heat contact therewith, means for supporting the ends of said plates, said plates having bifurcated ends, and a pair of bus bars passing through openings in the fish-tail ends of all of said plates for electrically connecting the terminals of said electric heating elements to a source of current.

4. In an electric heater, a flat heating plate having fish-tail shaped ends, the extremities of said ends comprising four nibs to be received in a pair of supporting brackets, and a flat electric heating element located on one side of said plate in flat heat conducting contact therewith, each of said brackets comprising a pair of vertical feet, and an offset supporting section spaced from said feet.

5. In an electric air heater, a cabinet having a lower air inlet and an upper air outlet, a heating unit comprising a pair of opposed vertical end frames and a plurality of vertical electrically heated cross-plates attached to said frames, each end of said cabinet having a pair of guide flanges for detachably supporting one of said end frames.

6. In an electric air heater, a cabinet having a lower air inlet and an upper air outlet, a heating unit comprising a pair of opposed vertical end frames and a plurality of vertical electrically heated cross-plates attached to said frames, each end of said cabinet having a guide flange for detachably supporting one of said end frames.

7. In an electric air heater, a cabinet having a lower air inlet and an upper air outlet, each side of said cabinet having a pair of horizontal guide clip flanges mounted thereon in opposed relation, and a heating unit comprising a pair of opposed vertical end frames connected by an insulated electrical heating element detachably mounted in said guide clip flanges.

8. In an electric room heater, a cabinet having a lower air inlet and an upper air outlet, a heating unit comprising a pair of vertical opposed end frames having offset upper and lower extremities adapted to be supported against the side walls of said cabinet, said end frames being connected by an insulated horizontal heating element.

In testimony whereof, we have affixed our signatures to this specification.

STANLEY HART.
MAURICE G. STEELE.